Patented Feb. 25, 1930

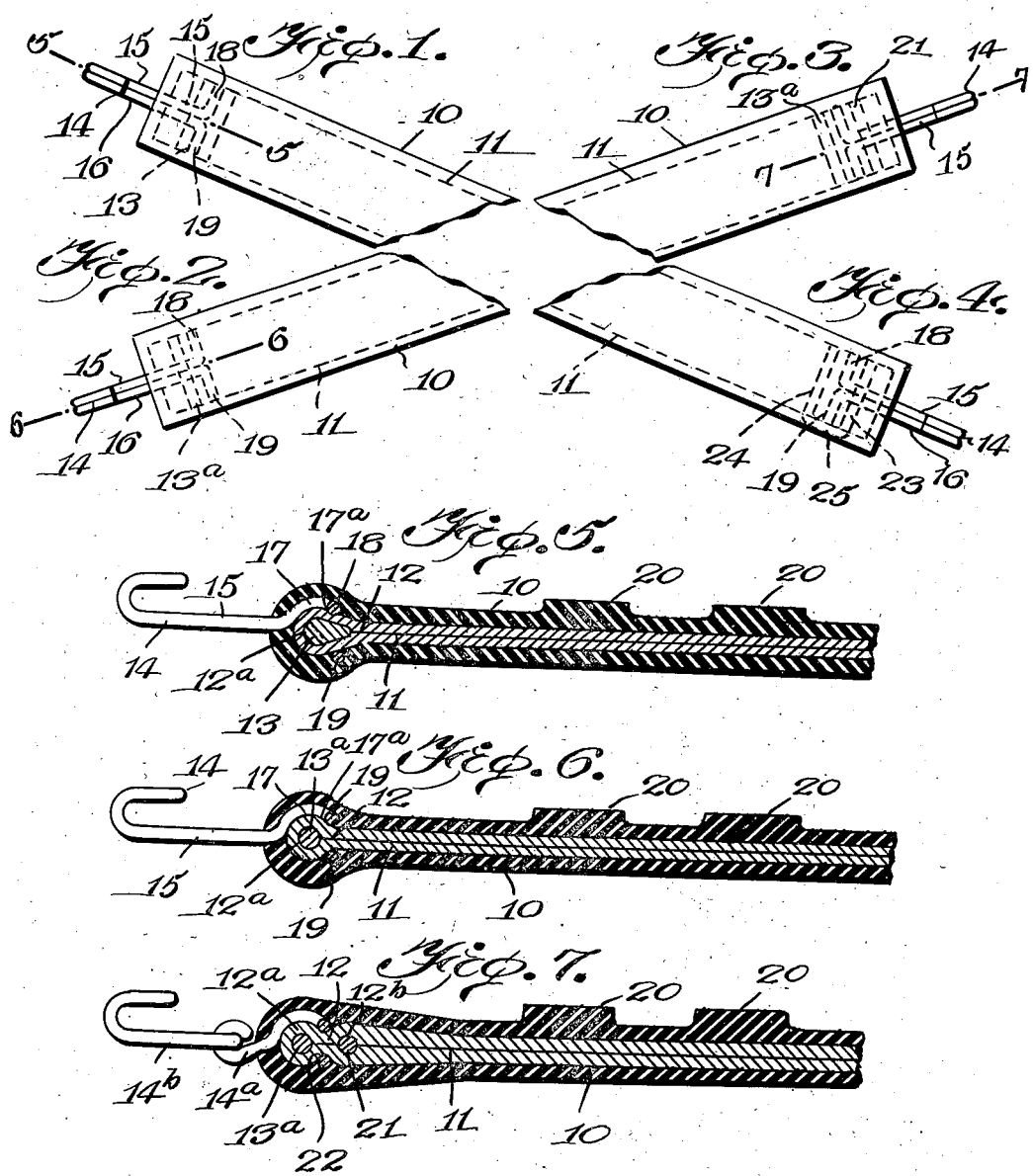

1,748,824

UNITED STATES PATENT OFFICE

CLIFFORD A. BARDEN, OF OBERLIN, OHIO

RUBBER-CHAIN HOOK ATTACHMENT

Application filed January 21, 1929. Serial No. 333,945.

This invention relates to the end hook attachment for rubber chains or non-skid devices for use on tires of vehicle wheels, which permits the cross members to be readily replaced when worn or otherwise unfitted for service, which cross members may be either of the X form or cruciform shape or otherwise, all of which are connected at their ends to side chains.

An important object of the invention is to provide a rubber chain end hook attachment which will not readily separate or pull out from the place that it is embedded or secured to the rubber cross member itself, and one that is also durable and simple in construction.

These and other objects I attain by the construction shown in the accompanying drawings, in which the same reference characters indicate the same parts in all of the views:

Figure 1 is a plan view of a portion of a rubber cross chain showing the end hook attachment thereon.

Figure 2 is a portion of a rubber cross chain showing a modification of the end hook attachment thereon.

Figure 3 is a portion of a rubber cross chain showing another modification of the end hook attachment thereon.

Figure 4 is a portion of a rubber cross chain showing still another modification of the end hook attachment thereon.

Figure 5 is a sectional view taken on the lines 5—5 of Figure 1.

Figure 6 is a sectional view taken on the lines 6—6 of Figure 2.

Figure 7 is a sectional view taken on the lines 7—7 of Figure 3, but with an additional hook member fastened thereon.

Referring now more particularly to the drawings, numeral 10 represents a portion of the ordinary rubber cross chain adapted to lie over the surface of an automobile tire, which cross chain may be of the X shape or cruciform shape or singular rubber cross strap member adapted to be attached to a side chain forming a part of anti-skid rubber chains.

In Figures 1 and 5, 11 represents a portion of an inner canvas section which is normally doubled over upon itself at 12, so that an eyelet 12$^a$ is formed thereby, and a wedge shaped pin member 13 is inserted in said eyelet 12$^a$, as shown more especially in Figure 5. The end hook member 14 comprises two branches 15 and 16 which terminate into bends 17 passing over the wedged out portion 17$^a$ of the canvas, and then each branch takes a right angle turn away from each other next and relatively close to the wedged out portion of the canvas at 18 and 19 so that the canvas is completely enwrapped by the branches of the hook end member 14, so that it is practically impossible for the hook 14 to be separated or pulled away from or over the wedged out portion at this end of the rubber chain. Of course, the outer rubber portion of the strap or cross member 10 is vulcanized upon the canvas 11 after the canvas has been properly doubled over and wedged out and the hook secured thereto by means of said wedging and wedge pin. The rubber strap 10 likewise may be provided with suitable road engaging treads such as 20 being of suitable design.

Referring now to Figures 2 and 6 the same description as applied to Figures 1 and 5 applies equally as well to Figures 2 and 6 except that 13$^a$ is a pin circular in transverse cross-section, which likewise is inserted in eyelet 12$^a$ of canvas 11 so as to form a shoulder upon which portions of the hook 18 and 19 will be secured, as described hereinbefore.

Referring to Figures 3 and 7 these figures differ from those previously described in that this modification is provided with two pin members 13$^a$ and 21 (each being circular in transverse cross-section) in the eyelets 12$^a$ and 12$^b$ formed in between the inner contacting side of canvas 11. In between these two pins 13$^a$ and 21 and on the outside of the canvas, the upper and lower portions of the hook 14$^a$ are closely fitted there around as previously described so that it will not ride over the spread out or wedged out portion of the canvas material as will be seen more especially in Figure 7. The extra pin 21 prevents the possibility of hook 14$^a$ from being pushed away or separated from the strap 10, due to recess 22 formed upon the outer surface of canvas 11 and in between these two pins 13ª and 21. A supplemental hook 14ᵇ is added in Figure 7, so that one may be readily detached from the other.

In Figure 4 the pins 23 and 24 are joined together by side pin 25 so as to form what is known as a staple or U-shaped pin. The cross sectional view of these two pins is the same as that of Figure 7, which description thereof also applies to this modification.

It will be obvious that the general structure hereinbefore set forth may be modified in certain particulars, and I accordingly do not limit myself to such specific structure except as hereinafter claimed.

Having thus described my invention what I claim is:

A non-metallic anti-skid device for automobile tires comprising an elongated fabric insert bent upon itself to form eyes at the ends thereof, a pin inserted in each of said eyes in tight fitting engagement therewith, a one piece metallic hook member at each end of said fabric insert formed with a continuous loop at the inner end thereof, said loop being in a plane at right angles to the longitudinal axis of said fabric insert and hook, and adapted to closely encircle said insert at the inner edge of said pin and eye, and a moulded rubber body completely covering said fabric insert said pins and said loops and vulcanzied thereto.

In testimony whereof I affix my signature.

CLIFFORD A. BARDEN.